(12) United States Patent
Aarnio et al.

(10) Patent No.: US 8,713,079 B2
(45) Date of Patent: Apr. 29, 2014

(54) METHOD, APPARATUS AND COMPUTER PROGRAM PRODUCT FOR PROVIDING METADATA ENTRY

(75) Inventors: Ari Aarnio, Espoo (FI); Olli-Matti Oksanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/424,615

(22) Filed: Jun. 16, 2006

(65) Prior Publication Data

US 2007/0294294 A1  Dec. 20, 2007

(51) Int. Cl.
*G06F 12/00* (2006.01)
*G06F 15/16* (2006.01)
*G06F 17/30* (2006.01)
*G06F 13/14* (2006.01)

(52) U.S. Cl.
USPC .......................................... 707/899; 345/169

(58) Field of Classification Search
USPC ............................ 707/3, 104.1, 10, 100–102, 707/999.001–999.007, 999.01, 1/1, 741, 707/793, 765, 693, 899; 345/157–184; 455/403, 566, 550.1; 715/205–261, 715/802–810, 771, 840; 348/207.1, 207.99, 348/231.99, 333.01; 705/50–52; 341/176
See application file for complete search history.

(56) References Cited

U.S. PATENT DOCUMENTS

| | | | |
|---|---|---|---|
| 6,629,104 B1 | 9/2003 | Parulski et al. | |
| 6,781,575 B1 * | 8/2004 | Hawkins et al. | 345/173 |
| 6,799,061 B2 | 9/2004 | Jeoung | |
| 7,228,299 B1 * | 6/2007 | Harmer et al. | 707/741 |
| 7,735,021 B2 * | 6/2010 | Padawer et al. | 715/810 |
| 2003/0004983 A1 * | 1/2003 | Cohen | 707/500 |
| 2004/0119755 A1 * | 6/2004 | Guibourge | 345/827 |
| 2005/0010589 A1 | 1/2005 | Novak et al. | |
| 2005/0080788 A1 * | 4/2005 | Murata | 707/10 |
| 2006/0221190 A1 * | 10/2006 | Limberis et al. | 348/207.1 |
| 2007/0139533 A1 * | 6/2007 | Ohashi | 348/231.99 |

FOREIGN PATENT DOCUMENTS

| | | |
|---|---|---|
| EP | 1422 600 A2 | 5/2004 |
| WO | WO 2005/024681 A1 | 3/2005 |

OTHER PUBLICATIONS

Chinese Office action for corresponding CN Patent App. No. 200780022198.1 dated Jul. 6, 2010, pp. 1-18.
Korean Office action for corresponding KR app. No. 10-2008-7031599 dated Aug. 31, 2010, pp. 1-5.

* cited by examiner

*Primary Examiner* — Usmaan Saeed
*Assistant Examiner* — Cecile Vo
(74) *Attorney, Agent, or Firm* — Ditthavong Mori & Steiner, P.C.

(57) ABSTRACT

An apparatus for providing metadata entry includes an output device, an interface element and a tagging element. The output device is capable of rendering an activity such as a media file via an electronic device. The interface element is capable of accepting a user input of a selection of a key of the electronic device. The tagging element is configured to modify a metadata entry of the rendered media file in response to selection of the key.

31 Claims, 6 Drawing Sheets

| CONTENT ITEM | ATTRIBUTE | MODIFIER | KEY |
|---|---|---|---|
| JPEG0001 | Work | | 0 |
| JPEG0002 | Christmas | 2004 | 1 |
| Xmas.wav | Christmas | 2005 | 1 |
| JPEG0003 | Birthday | Ari | 2 |
| JPEG0004 | Birthday | John | 2 |
| Music.mp3 | Spring break | | 3 |
| MPEG001 | Sports | | 4 |

METHOD, APPARATUS AND COMPUTER PROGRAM PRODUCT FOR PROVIDING METADATA ENTRY

TECHNOLOGICAL FIELD

Embodiments of the present invention relate generally to content management technology and, more particularly, relate to a method, device, mobile terminal and computer program product for employing metadata entry for use in content management.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. As mobile electronic device capabilities expand, a corresponding increase in the storage capacity of such devices has allowed users to store very large amounts of content on the devices. Given that the devices will tend to increase in their capacity to store content, and given also that mobile electronic devices such as mobile phones often face limitations in display size, text input speed, and physical embodiments of user interfaces (UI), challenges are created in content management. Specifically, an imbalance between the development of stored content capabilities and the development of physical UI capabilities may be perceived.

In order to provide a solution for the imbalance described above, metadata has been utilized to enhance content management. Metadata, which may also be referred to as "a tag" includes information that is separate from an object, but related to the object. Objects may be tagged by adding metadata to the object. As such, metadata may be used to specify properties associated with the object that may not be obvious from the object itself. Metadata may then be used to organize the objects to improve content management capabilities.

Currently, devices such as mobile terminals are becoming more and more adept at content creation (e.g., images, videos, product descriptions, event descriptions, etc.). However, tagging of objects produced as a result of content creation is typically a challenge given the limited physical UI capabilities of mobile terminals. For example, it may be cumbersome to type in a new metadata entry for each content item created. Accordingly, although tagging objects with metadata improves content management capabilities, the efficiency of tagging may become a limiting factor.

Additionally, some methods have been developed for inserting metadata based on context. Context metadata describes the context in which a particular content item was "created". Hereinafter, the term "created" should be understood to be defined such as to encompass also the terms captured, received, and downloaded. In other words, content is defined as "created" whenever the content first becomes resident in a device, by whatever means regardless of whether the content previously existed on other devices. Context metadata can be associated with each content item in order to provide an annotation to facilitate efficient content management features such as searching and organization features. Accordingly, the context metadata may be used to provide an automated mechanism by which content management may be enhanced and user efforts may be minimized. However, context metadata and other types of metadata may be standardized dependent upon factors such as context. Thus, tagging of content items that may have, for example, more than one context may become complicated.

Thus, it may be advantageous to provide improved methods of associating metadata with content items that are created, which are simpler and easier to employ in mobile environments.

BRIEF SUMMARY

A method, apparatus and computer program product are therefore provided to enable efficient metadata entry. In particular, a method, apparatus and computer program product are provided that allow a user, for example, of a mobile terminal to associate particular metadata with particular functional elements such as keys of either a keyboard, keypad or a touch screen key element. Accordingly, more efficient tagging may be performed without the use of drag and drop operations, which may be difficult to employ in mobile devices. Additionally, a dedicated key or a shared dedicated key may be provided to implement certain embodiments of the tagging feature provided. Selection of the key may cause insertion of an editable tag, may launch a respective tagging feature on an internet service or a mobile device application, or may result in displaying a collection of pre-created metadata tags from which the user may select the tag or tags to be used. Accordingly, the efficiency and universality of metadata tag usage may be increased and content management for mobile terminals may be improved.

In one exemplary embodiment, a method of providing metadata tagging is provided. The method includes rendering an activity such as a media file via an electronic device, receiving a selection of a key of the electronic device, and modifying a metadata entry of the rendered media file in response to selection of the key. Modifying the metadata may include assigning the metadata entry of the selected key as metadata of the rendered media file. Modifying the metadata may alternatively include rendering the metadata of the rendered media file relating to the selected key.

In another exemplary embodiment, a computer program product for providing metadata tagging is provided. The computer program product includes at least one computer-readable storage medium having computer-readable program code portions stored therein. The computer-readable program code portions include first, second and third executable portions. The first executable portion is for rendering an activity such as a media file via an electronic device. The second executable portion is for receiving a selection of a key of the electronic device. The third executable portion is for modifying a metadata entry of the rendered media file in response to selection of the key.

In another exemplary embodiment, an apparatus for providing metadata tagging is provided. The apparatus includes an output device, an interface element and a tagging element. The output device is capable of rendering an activity such as a media file via an electronic device. The interface element is capable of accepting a user input of a selection of a key of the electronic device. The tagging element is configured to modify a metadata entry of the rendered media file in response to selection of the key.

In another exemplary embodiment, an apparatus for providing metadata tagging is provided. The apparatus includes means for rendering an activity such as a media file via an electronic device, means for receiving a selection of a key of the electronic device, and means for modifying a metadata entry of the rendered media file in response to selection of the key.

In another embodiment, metadata assigned to a key is, by selection of the key, also assigned to a media file that is selected or rendered.

Embodiments of the invention may provide a method, apparatus and computer program product for advantageous employment in a mobile electronic device environment, such as on a mobile terminal capable of creating content items and objects related to various types of media. As a result, for example, mobile terminal users may enjoy an improved content management capability.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
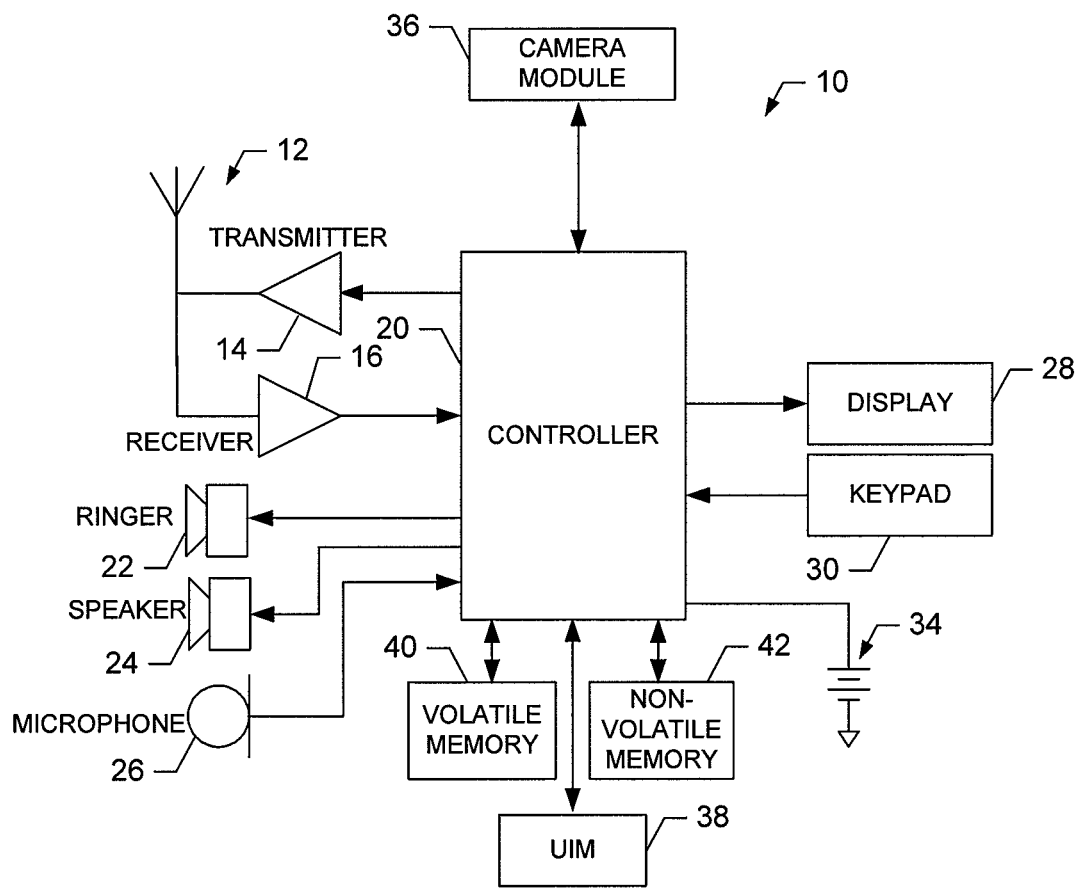
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12, or multiple antennas, in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA. Another option is that the mobile device may receive a broadband broadcast program and therefore have a corresponding receiver for this purpose.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28 that may also be external display e,g, a TV, a monitor or a LCD projector, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement or any variant of a keypad or keyboard specified for mobile devices. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing module 36, such as a camera, video and/or audio module, in communication with the controller 20. The media capturing module 36 may be any means for capturing an image, video and/or audio for storage, display or transmission. For example, in an exemplary embodiment in which the media capturing module 36 is a camera module, the camera module 36 may include a digital camera capable of forming a digital image file from a captured image. As such, the camera module 36 includes all hardware, such as a lens or other optical device, and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a universal identity element (UIM) 38. The UIM 38 is typically a memory device having a processor built in. The UIM 38 may include, for example, a subscriber identity element (SIM), a universal integrated circuit card (UICC), a universal subscriber identity element (USIM), a removable user identity element (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
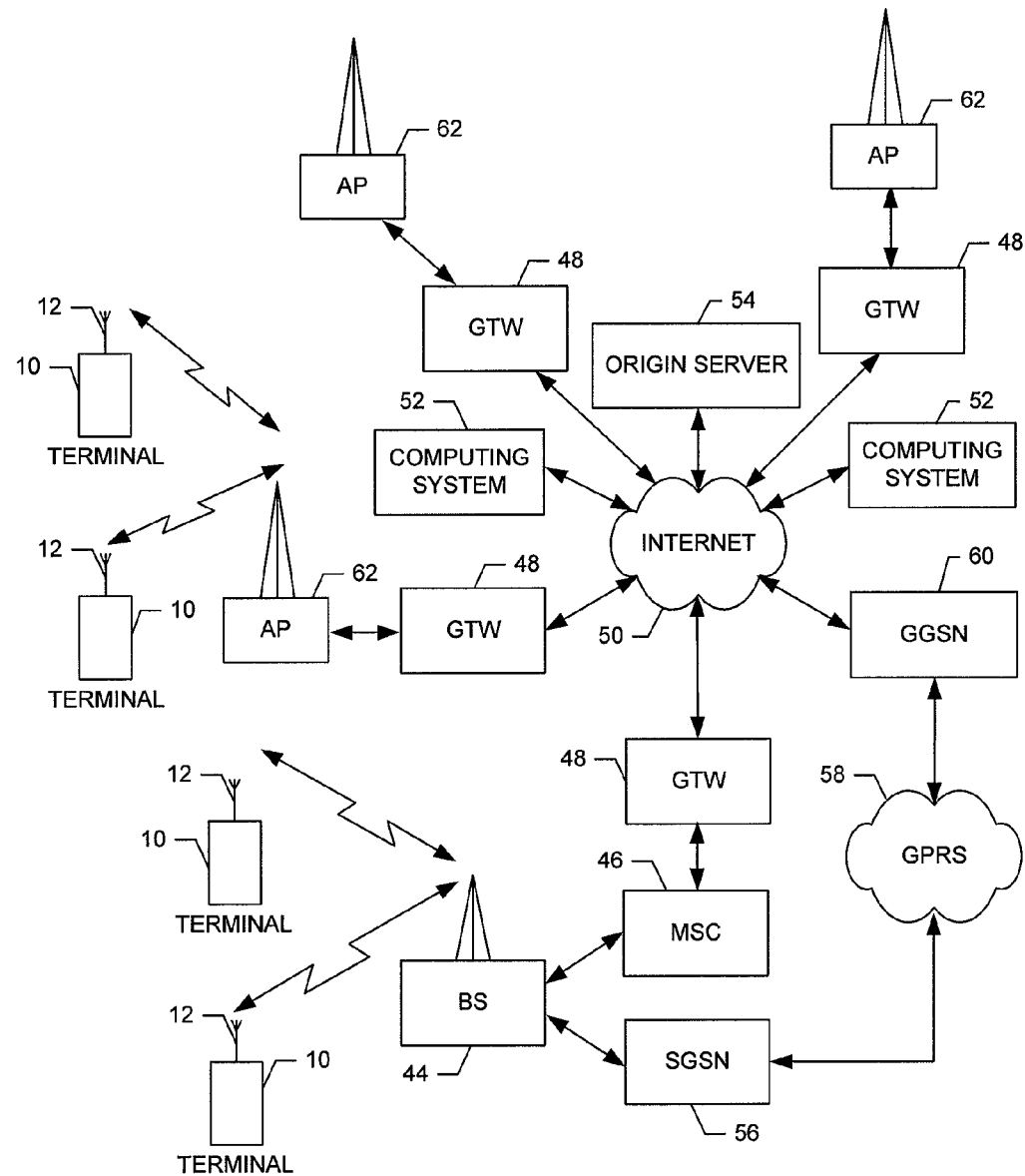
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for providing metadata entry are displayed. The system of FIG. 3 may be employed, for example, on the mobile terminal 10 of FIG. 1. However, it should be noted that the system of FIG. 3, may also be employed on a variety of other devices, both mobile and fixed, and therefore, the present invention should not be limited to application on devices such as the mobile terminal 10 of FIG. 1. For example, the system of FIG. 3 may be employed on a personal computer, a camera, a video recorder, a remote server, etc. Alternatively, embodiments may be employed on a combination of the devices including, for example, those listed above. It should also be noted, however, that while FIG. 3 illustrates one example of a configuration of a system for providing metadata entry for use in metadata-based content management, numerous other configurations may also be used to implement embodiments of the present invention.

Figure 3:
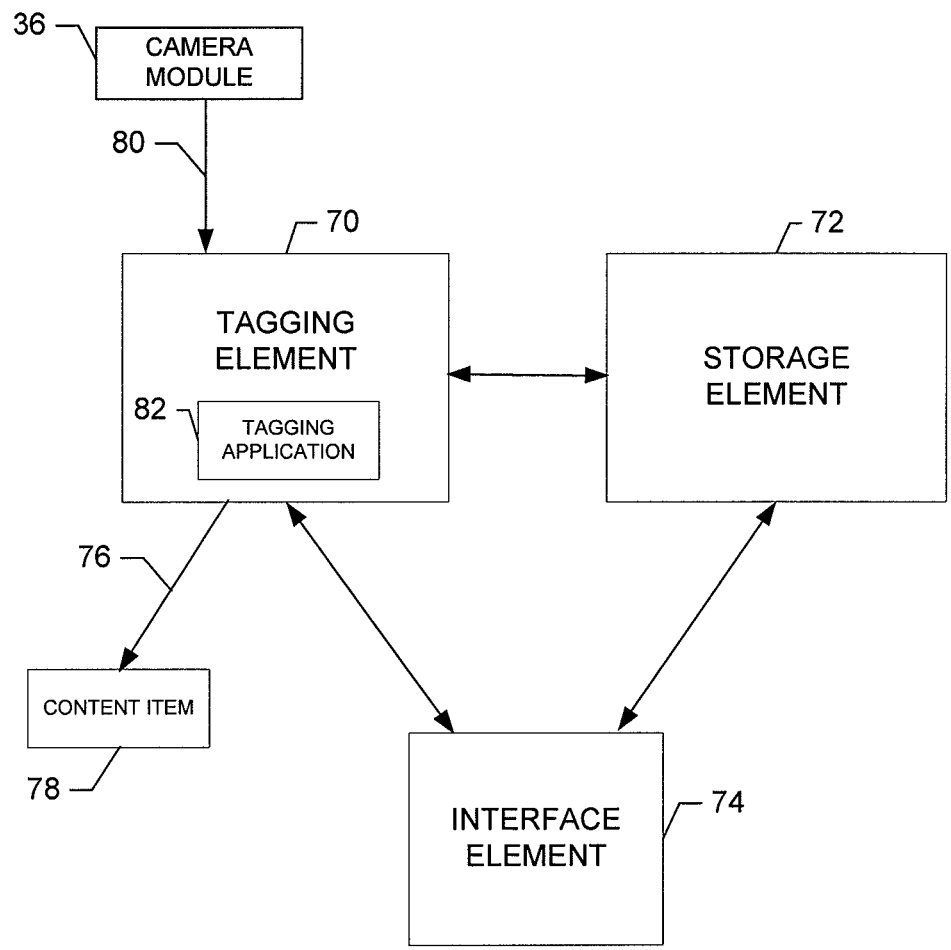
FIG. 3 illustrates a block diagram of portions of a system for providing metadata entry according to an exemplary embodiment of the present invention.

Referring now to FIG. 3, a system for providing metadata entry is provided. The system includes a tagging element 70, an interface element 72, and a storage element 74. It should be noted that any or all of the tagging element 70, the interface element 72, and the storage element 74 may be collocated in a single device. For example, the mobile terminal 10 of FIG. 1, may include all of the tagging element 70, the interface element 72, and the storage element 74. Alternatively, any or all of the tagging element 70, the interface element 72, and the storage element 74 may be disposed in different devices. For example, one or more of the tagging element 70, the interface element 72, and the storage element 74 may be disposed at a server or remote display, while others are disposed at a mobile terminal in communication with the server or remote display. In an exemplary embodiment, the tagging element 70 may be embodied in software instructions stored in a memory of the mobile terminal 10 or the server and executed by a processing element such as the controller 20 or a processing element of the server. The interface element 72 may include, for example, the keypad 30 and the display 28 and associated hardware and software. It should be noted that the interface element 72 may alternatively be embodied entirely in software, such as is the case when a touch screen is employed for interface using functional elements such as software keys accessible via the touch screen using a finger, stylus, etc. The storage element 74 may be any of the memory devices described above in connection with the mobile terminal 10 of FIG. 1, or any other suitable memory device which is accessible by a processing element and in communication with the tagging element 70 and the interface element 72. It should also be noted that although embodiments of the present invention will be described below primarily in the context of content items that are still images such as pictures or photographs, any content item that may be created at the mobile terminal 10 or any other device employing embodiments of the present invention is also envisioned. One alternative may be video which is currently recorded by a device. The user can easily add metadata to the video according to an embodiment of the invention. Depending on the context the metadata to be inserted may suggest "do you want to add today's weather situation as metadata to the video?" Later on, the user can see that the recording was done and what the weather was at the time of the recording (e.g. summer time and temperature 70F. etc.).

Another embodiment may be that email or any other application the user has active on screen can be incorporated by metadata using this innovative approach. In one embodiment, the user can be given instructions to cross-reference between information of different applications. For example, if a user has email open and also has the browser open, then by tagging the user can give metadata information to the email. In one embodiment, a system may ask when clicking a tag button "Do you want add current URL to be associated with this email?" By clicking an alternative "Yes", the metadata may be added to the email. Furthermore in one embodiment, the user may be browsing a number of web pages and may be linking different things or matters together in the user's mind by associating matters. When the user desires to add metadata to the web page browsed, the user may be asked when a tag button is clicked, for example, "Do you want to add www.nokia.com as metadata to this web page/" By clicking "yes", the metadata may be added. In one example, the metadata information may be taken from web page text or even a picture shown in a web page. The interface element 72 may include an option to capture text or image data from the web page by adding the browser capability to the metadata selection. For example, when the user has selected "Add metadata" (e.g. by the tag button), a browser type window may be opened and the user can scroll the page and select the desired parts of text or image, video or e.g. advertisement. When the user has selected the desired parts, the user may be asked whether or not to accept these parts to be added as metadata to the currently open application. If the user selects "Yes", the metadata is added and then the user has the advantage of utilizing this information, for example, in searches in a device. Metadata can even be linked to the certain portions of an html or xml document. When this has been done a map of this certain portion and metadata can be further developed.

In an exemplary embodiment, the tagging element 70 and/or the interface element 72 may be embodied in software as instructions that are stored on a memory of the mobile terminal 10 and executed by the controller 20. However, each of the elements above may alternatively operate under the control of a corresponding local processing element or a processing element of another device not shown in FIG. 3. A processing element such as those described above may be embodied in many ways. For example, the processing element may be embodied as a processor, a coprocessor, a controller or various other processing means or devices including integrated circuits such as, for example, an ASIC (application specific integrated circuit).

The tagging element 70 may be any device or means embodied in either hardware, software, or a combination of hardware and software that is capable of executing a tagging application 82 for assigning a metadata tag 76 to a content item 78 or modifying the metadata tag 76. In an exemplary embodiment, the tagging element 70 may be in operable communication with the camera module 36. In this regard, the tagging element 70 may receive an indication 80 from the camera module 36 that the content item 78 is about to be created, or has been created. For example, the indication 80 may be indicative of an intention to create a content item, which may be inferred when a camera application is launched, when lens cover removal is detected, or any other suitable way. In embodiments where the indication 80 is indicative of an intention to create a content item, for example, the tagging element 70 may utilize context information or proximity information regarding devices or individuals in proximity in order to assign the metadata tag 76 including a reference to the context or proximity information to the content item 78 upon creation of the content item 78. In this regard, the context information may be gathered from any suitable source such as currently running applications, sound, time and date, etc real time manner, i.e. "on the fly". Alternatively, the indication 80 may be triggered in response to actual creation of the content item 78. As such, receipt of the indication 80 may trigger the tagging element 70 to launch a tagging application to enable the user to apply the metadata tag 76 to the content item 78.

Figures 4, 5:
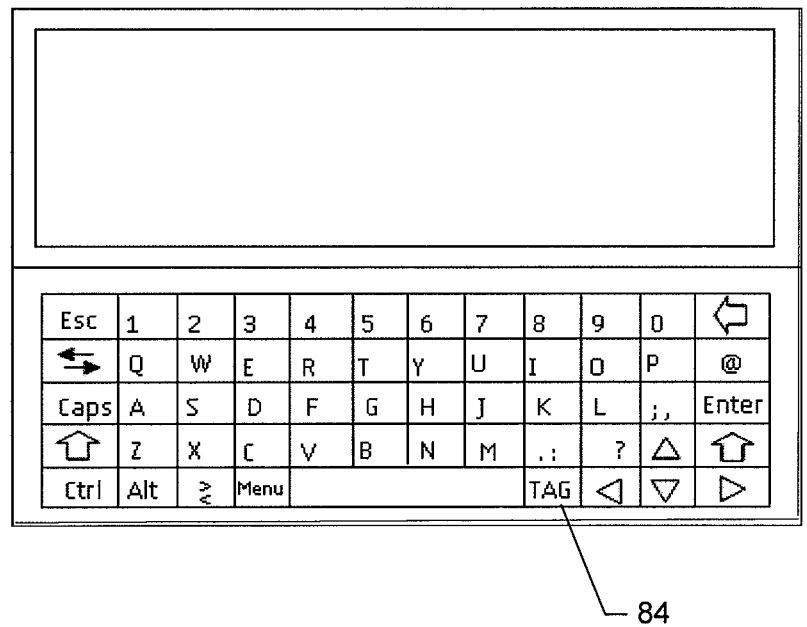
FIG. 4 illustrates a keyboard including a dedicated key for use in a system for providing metadata entry according to an exemplary embodiment of the present invention.
FIG. 5 illustrates a list of metadata tags and related content items according to an exemplary embodiment of the present invention.

The tagging application may also be launched manually such as, for example, by selecting an object and/or rendering such as the content item 78 and further selecting an option, such as through a menu of options, which launches the tagging application. Alternatively, as shown in FIG. 4, in one aspect of the invention, a dedicated key 84 may be provided to launch the tagging application. It should be noted that although FIG. 4 illustrates the dedicated key 84 as a key of a standard QWERTY keyboard, the dedicated key 84 may also be a button or key on a typical mobile terminal keypad or of a touch screen display. In this regard, the dedicated key 84 may be a soft key or any other key, regardless of the location of the key on the mobile terminal.

The dedicated key 84 may have any of numerous functions. For example, the dedicated key 84 may be used to manually launch the tagging application thereby enabling a user to utilize the tagging element 70 to apply a metadata tag, for example, to a selected content item. Alternatively, if no content item is currently selected, the dedicated key 84 may be used to launch the tagging application for displaying a list 86 of metadata tags and related content items as shown, for example, in FIG. 5, describing one aspect of the invention. In this regard, the list 86 may further include context information or other information which may be used to organize the list 86. For example, user preferences may be used to specify that the list 86 be organized by context information, proximity information by date entered or modified, by alphabetical order, etc. or by a combination of the above. The list 86 may be considered a universal tag database, since the list 86 may be accessed within all services and display all tags, regardless of their associated service or application. Conventional tags may be reused in different contexts and thus, when in a particular context, only tags used in the particular context may be viewed. However, embodiments of the present invention provide for the list 86 to issue a universal listing of tags for every context such that all tags and their corresponding content items may be viewed from a single database according to user preferences or user selection. The list 86 may be stored, for example, on the storage element 74 which may be disposed at, for example, either a mobile terminal or at a server. Individual metadata tags within the list 86 may be selected for modification of selected metadata tags. Modification of metadata tags may also be undertaken from the content item itself. In other words, when the content item is being rendered, it may be possible to select an option of modifying the metadata tag associated with the content item. In one further embodiment of the invention, the list 86 may include e.g. list of browsable content such as web pages, URLs or other parts of the content shown in the specific URL. For example, when a URL is selected, then the next step will be to define whether or not the URL should be associated as metadata or, for example, portions of the web page like text. This can be shown to the user in a user interface hierarchically by giving options to select such as "Do you want to add URL as metadata?", "Do you want add text in page as metadata?", or "Do you want add selected portions as metadata?". For example, when adding metadata to video the added metadata may be e.g. browsed detailed information or at least selected information parts of actors in a tag window to be included as metadata.

It should be understood that although the dedicated key 84 may be used in any number of services, the dedicated key 84 may have different functionality in each of the services as provided by developers of each of the services. In this way, the dedicated key 84 provides an open API for service developers by enabling developers to "record" the required functionality for the dedicated key 84 as it relates to launching the tagging application and assigning tags in each different service.

In an exemplary embodiment, the tagging element 70 may associate particular keys with corresponding metadata thereby providing a predefined metadata tag and value to be associated with a selected key. As such, when executing the tagging application with regard to a content item, a particular key may be selected as a shortcut to tag the content item with metadata corresponding to the particular key. In this regard, the tagging application may be previously launched, such as by use of the dedicated key 84 and subsequent selection of the particular key to tag the content item. Alternatively, selection of a content item alone may be sufficient to enable tagging of the content item with a tag corresponding to the particular key when the particular key is selected. For example, a key from a mobile terminal keypad such as the number 2 key may be associated with a particular metadata type such as a topic and a value such as a birthday. Thus, following creation of an image taken at a birthday event, the indication of image creation may launch the tagging application and the tagging element 70 may be employed to enable the user to press the number 2 key to assign metadata identifying the image as being associated with the birthday event. Alternatively, the pressing of the number 2 key while the content item is being rendered may launch the tagging application. In an exemplary embodiment, further specificity regarding the metadata assigned may be achieved. For example, other information such as the name of the individual having the birthday may be entered. In this regard, the other information may be pre-assigned to the number 2 key, or may be added after the number 2 key has been pressed to assign the birthday metadata. Metadata may be in hierarchical order such as, for example, birthday, name, or journey, China, Shanghai, restaurant Xuan, Top tower building. This latter information can be suggested by, for example, a local service in that area, through WLAN access point information, or of that restaurant. As yet another alternative, metadata entries can be used as an input to a diary.

Figure 6:
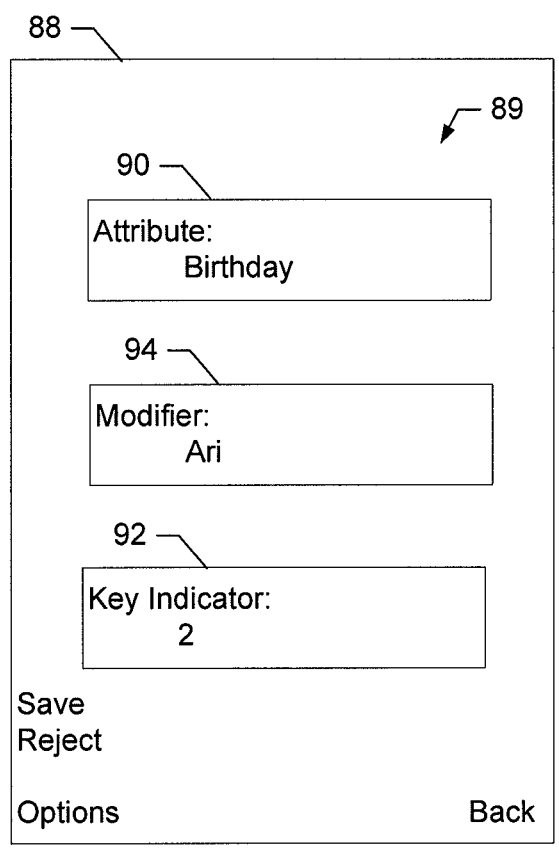
FIG. 6 illustrates an example of a metadata entry which may be used to assign a predefined relationship between a key and particular metadata in accordance with an exemplary embodiment of the present invention.

FIG. 6, one aspect of the invention, illustrates an example of a metadata entry which may be used to assign a predefined relationship between a key and particular metadata in accordance with an exemplary embodiment. Metadata entries may be stored in the storage element 74 and accessible by a user via, for example, a mobile terminal in order to assign the predefined relationship. Accordingly, metadata entries may be stored at either a server (i.e., an internet server or a presence server) or a mobile terminal or other electronic device. As shown in FIG. 6, a display 88 may present information related to a metadata entry 89 which may include fields defining characteristics related to the metadata entry 89. For example, the characteristics may include an attribute field 90 which defines the topic or type of the metadata, such as an event, date, time, title, name of device or person in proximity (as determined via Bluetooth, WLAN, or RFID), presence information, playlist or genre information (i.e., rock, relaxed, party, sport, latin, R&B, heavy), etc. The characteristics may also include a key indicator field 92 which indicates which key is associated with the metadata entry 89. Optionally, the characteristics may include a modifier field 94 (or multiple modifier fields) which may provide a related value to the value of the attribute field 90 or further specify information associated with the metadata entry 89.

The predefined relationship may be assigned via the tagging application. A key of the keypad may be pre-assigned characteristics related to a metadata entry. For example, the tagging application may be launched via either the dedicated key 84 or any other mechanism and the tagging element 70 may be used in cooperation with the interface element 72 to assign a value to the attribute field 90 which is to be associated with a particular key. One way of assignment (i.e., predefining a relationship between a key and a metadata entry) may be a separate option or menu within the tagging application. As shown in FIG. 6, a key of the keypad, such as the number 2 key, may be selected. The number 2 then appears in the key indicator field 92 to specify that the metadata entry 89 for the current key assignment will relate to the number 2 key. The interface element 72 may then be used to enter a value into the topic field 90 and, if desired, the modifier field 94. In an exemplary embodiment, a value may be inserted in the modifier field 94 in response to assigning the metadata entry 89 to a content item rather than being predefined.

Entry of values into either the attribute field 90 or the modifier field 94 via the interface element 72 may take any suitable form. For example, values may be manually entered into the one or more attribute and/or modifier fields 90 and 94 via typing or spelling the values out using a keypad. As another example, various topics may be predefined and selected from a list. For example, the interface element 72 may be used to cycle through various possible pre-typed values such as holiday, football, hockey, Christmas, spring break, anniversary, birthday, etc. As yet another example, a combination of the above examples may be provided. Additionally, it should be noted that a particular combination or sequence of keys could also be associated with a particular metadata entry. For example, entry of a key sequence of "313" could associate a particular metadata entry such as "car" with the content item being currently rendered. Additional information regarding a specific car may then be added as a modifier, such as "Donald Duck", for Donald Duck's car.

Accordingly, in operation according to the example shown in FIG. 6, if a picture is taken at a birthday event, following image capture the number 2 key may be pushed to assign metadata corresponding to a birthday event. An option to add a modifier may then appear, in response to which, Ari's name may be inserted, thereby denoting that the birthday is Ari's birthday. Alternatively, the number 2 key could be associated with Ari and the birthday event could be added as the modifier. As yet another alternative, the number 2 key may be associated not only with one of Ari or the birthday event while the other is added as a modifier after the fact, but with the combination of Ari and birthday. In other words, the number 2 key could be directly associated with Ari's birthday via the predefined relationship which was established as described above.

As a more specific example of an exemplary embodiment, after taking the picture and displaying the image on the display 88, the number 2 key (previously defined to correspond to Ari's birthday) may be selected. A dialog may be displayed stating, for example, "Do you want to add Ari's birthday as metadata for this image?" The user may then select the number 2 key again (or another designated key) to accept and assign the metadata to the image. Alternatively, the metadata may be assigned automatically after the selection. Ari's birthday may then be associated with the image as metadata which may be added to the list 86 for viewing among all other universally created metadata entries which may be sorted or organized in any suitable fashion. Additionally, context or proximity information may also be associated with the image as metadata and such information may also appear in the list 86 in association with corresponding metadata entries.

Adding or modifying metadata associated with a content item need not be limited to application only at the time of creation. Rather, metadata may be added or modified at any time. For example, if a series of images are being viewed from a photo library (or songs are being listened to from an audio collection) a currently selected image (or song) may have metadata assigned (or modified) by similarly pushing the key associated with the desired metadata to be assigned.

In one exemplary embodiment, keys associated with the numbers 0 through 9 may each be assigned a single metadata entry such that, for example, the ten most used metadata entries may be assigned to corresponding keys associated with the numbers 0 through 9. Metadata entries may be different for different applications (i.e., audio, video, image, or other media applications), for different content types (i.e., media, text, web page, etc.), for different contexts, or may be created in real time by context information (i.e. location, time, temperature, etc.) or for different combinations of the aforementioned. Accordingly, each key may be associated with multiple metadata entries, both within a particular application, content type or context and across multiple applications, content types and contexts. The tagging element 70 may be capable of determining the application, content type or context associated with a currently selected content item in order to permit entry of free text or modification of existing metadata entries in order to provide flexibility to support tagging in any of multiple applications. As such, the association of a particular key with a metadata entry may include a reference to the application, content type and/or context associated with the content item at the time of creation or rendering. Such reference to the application, content type and/or context may be provided, for example, in the modifier field 94 or in another portion of the metadata entry. Alternatively, one or more media files may be selected, and also one or more keys may be selected, so that a group of media files will have more metadata assignments.

In one embodiment, each value of the key indicator field 92 may have multiple corresponding values in the attribute and/or modifier fields 90 and 94. In other words, during key assignment, the same key may be assigned to more than one different metadata entry. Accordingly, the cycling function referred to above may be performed such that any of the fields may be kept constant while variable values for remaining fields are cycled through. For example, all possible values for the attribute field 90 that are associated with the number 2 key may be cycled through. In such an embodiment, when a key associated with multiple attribute and/or modifier values is pressed during tagging, the values associated with the key may be presented in order of statistical probability for selection by the user. In other words, the most likely value may be presented first or more prominently than other values and the other values may be presented in descending order of likelihood. For example, if the number 2 key is associated with attribute field 90 values hockey, football and baseball, and 65% of all metadata entries associated with the number 2 key relate to hockey, 25% relate to football, and 10% relate to baseball, then hockey could be displayed first or selectable via a single button push, while football and baseball could be displayed second and third, respectively, or otherwise selectable via one or more additional button pushes. As shown in FIG. 6, the metadata entry 89 may be saved or rejected following modification of values of any of the fields. Additionally, an option menu may be provided for expanded functions and a back or exit selection may be provided to return to a previous screen or exit from either key assignment or the tagging application.

Figure 7:
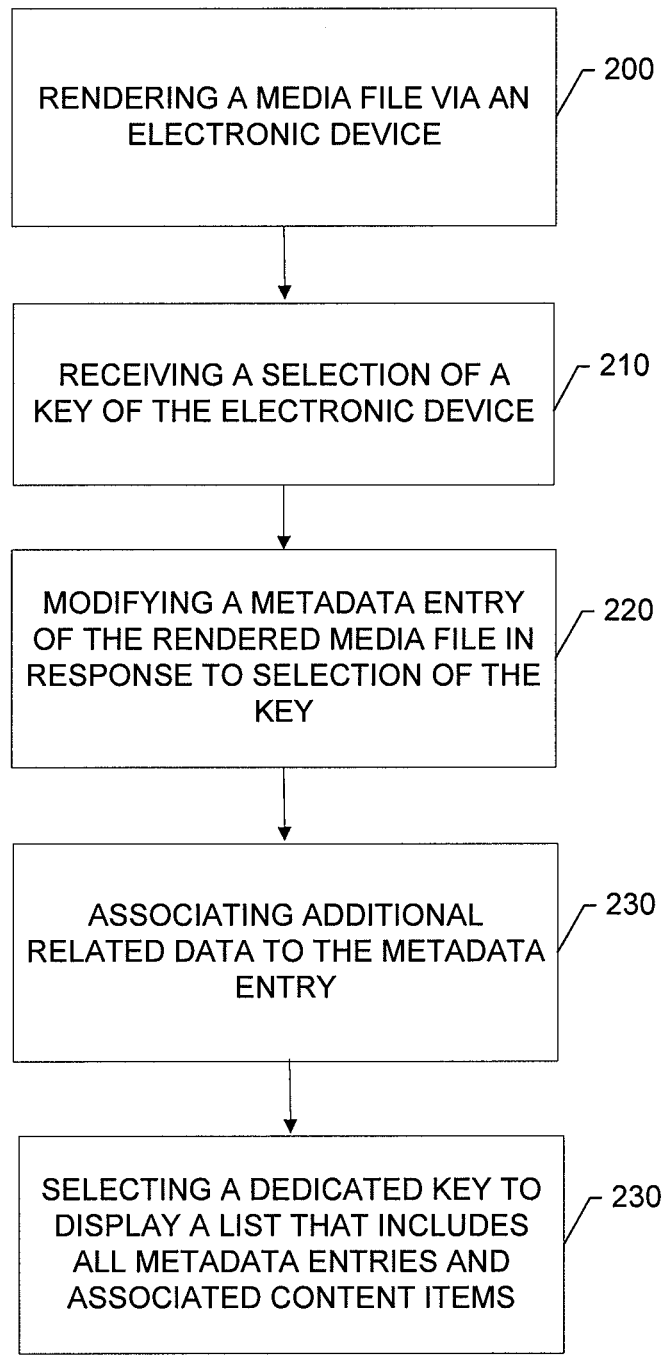
FIG. 7 is a block diagram according to an exemplary method for providing metadata entry according to an exemplary embodiment of the present invention.

FIG. 7 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing metadata entry includes rendering an activity such as a media file via an electronic device at operation 200. At operation 210, a selection of a key of the electronic device is received. The key may be either a hardware or software key. The metadata entry may be accessed from either a user device or a network device and may be created manually or from existing metadata on a user device, a server or a specific application. A metadata entry of the rendered activity such as the media file may be modified in response to selection of the key at operation 220. Modifying the metadata may include assigning the metadata entry of the selected key as metadata of the rendered activity. Modifying the metadata may alternatively include rendering the metadata of the rendered activity relating to the selected key. Optionally, additional related data may be associated with the metadata entry at operation 230. The additional related data may be based on devices or users in proximity or on presence information. Alternatively, the additional related data may include context information, media type information, and/or information related to the rendering application. The metadata entry may be displayed while the content item is being rendered. As yet another optional operation, a dedicated key may be selected to display a list that includes all metadata entries and corresponding content items at operation 240. The list may be a universal list including all metadata tags regardless of the application with which the metadata tags are associated.

It should be noted once again that although the preceding exemplary embodiments were described mainly in the context of image related content items, embodiments of the present invention may also be practiced in the context of any other content item. For example, content items may include, but are not limited to images, video files, television broadcast data, text, web pages, web links, audio files, radio broadcast data, broadcast programming guide data, etc. It should also be noted that embodiments of the present invention need not be confined to application on a single device. In other words, some operations of a method according to embodiments of the present invention may be performed on one device, while other operations are performed on a different device. Similarly, one or more of the operations described above may be performed by the combined efforts of means or devices in communication with each other.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    causing, at least in part, rendering of an activity as a rendered media file via an electronic device, the activity involving a media content item;
    causing, at least in part, reception of a selection of a pre-set, dedicated key of the electronic device to initiate assignment of an attribute to the media content item as metadata in the rendered media file, the pre-set, dedicated key being pre-set to automatically assign the attribute to a media content item as metadata when selected; and
    determining to modify a metadata entry of the rendered media file of the media content item associated with the rendered activity to include the attribute therein, in response to the selection of the pre-set, dedicated key, wherein the electronic device comprises at least one of a key of a touch screen and a key of a keypad corresponding to the pre-set, dedicated key, and
    wherein the pre-set, dedicated key having different functionality in each of a plurality of services within which the pre-set, dedicated key is used to initiate assignment of the attribute to the media content item as metadata,
    further comprising:
    causing, at least in part, displaying of a corresponding metadata entry while rendering a media content item; and
    determining to enter a new metadata entry of the media content item during creation of the media content item or during the rendered activity, in response to selection of the key,
    wherein the new metadata entry of the media content item references to at least one of a media application, a media content type, and media content context, and
    the media content context includes at least one of a location, time, and temperature.

2. A method according to claim 1, wherein the attribute includes presence information of another device or a person, a name of the another device or the person in proximity of the electronic device, or a combination thereof.

3. A method according to claim 1, wherein modifying the metadata entry comprises rendering the media content item or the metadata of the rendered activity relating to the selected key, and
    the metadata entry of the media content item is modified during the rendered activity, in response to selection of the key.

4. A method according to claim 1, wherein the attribute includes an event, title, playlist or genre information, presence information of another device or a person, a name of the another device or the person in proximity of the electronic device, or a combination thereof.

5. A method according to claim 2, further comprising associating additional related data to the metadata entry, wherein the additional related data comprises at least one of:
    an event;
    a date;
    a time;
    a title;
    playlist or genre information;
    context information;
    media type; and
    rendering application.

6. A method according to claim 1, further comprising causing, at least in part, displaying of at least three possible metadata entries in a cycle according to a probability order in response to the selected key being associated with the possible metadata entries.

7. A method according to claim 1, further comprising causing, at least in part, displaying of a list of all metadata entries and corresponding media content items in response to selection of a dedicated key.

8. A method according to claim 1, wherein causing, at least in part, rendering of the activity comprises controlling rendering of one of: an image; a video file; an audio file; a television broadcast; a radio broadcast; text; or a web page.

9. A method according to claim 1, wherein the metadata entry is modified using tag information obtained via browsing.

10. A method according to claim 1, wherein rendering of the activity comprises recording data.

11. A non-transitory computer-readable storage medium carrying one or more sequences of one or more instructions which, when executed by one or more processors, cause an apparatus to perform at least the following:

causing, at least in part, rendering of an activity as a rendered media file involving a media content item;

causing, at least in part reception of a selection of a pre-set, dedicated key of the apparatus to initiate assignment of an attribute to the media content item as metadata in the rendered media file, the pre-set, dedicated key being pre-set to automatically assign the attribute to a media content item as metadata when selected; and determining to modify a metadata entry of the rendered media file of the media content item associated with the rendered activity to include the attribute therein, in response to the selection of the pre-set, dedicated key, wherein the apparatus comprises at least one of a key of a touch screen and a key of a keypad corresponding to the pre-set, dedicated key, and wherein the pre-set, dedicated key having different functionality in each of a plurality of services within which the pre-set, dedicated key is used to initiate assignment of the attribute to the media content item as metadata, wherein the apparatus is caused to further perform:

causing, at least in part, display of a corresponding metadata entry while rendering a media content item; and determining to enter a new metadata entry of the media content item during creation of the media content item or during the rendered activity, in response to selection of the key, wherein the new metadata entry of the media content item references to at least one of a media application, a media content type, and media content context, and the media content context includes at least one of a location, time, and temperature.

12. A non-transitory computer-readable storage medium according to claim 11, wherein the attribute includes presence information of another device or a person, a name of the another device or the person in proximity of the electronic device, or a combination thereof.

13. A non-transitory computer-readable storage medium according to claim 11, wherein modifying the metadata entry comprises rendering the media content item or the metadata of the rendered activity relating to the selected key, and the metadata entry of the media content item is modified during the rendered activity, in response to selection of the key.

14. A non-transitory computer-readable storage medium according to claim 11, wherein the attribute includes an event, title, playlist or genre information, presence information of another device or a person, a name of the another device or the person in proximity of the apparatus, or a combination thereof.

15. A non-transitory computer-readable storage medium according to claim 14, wherein the apparatus is caused to further perform: associating additional related data to the metadata entry, the additional related data comprises at least one of:
   an event;
   a date;
   a time;
   a title;
   playlist or genre information;
   context information;
   media type; and
   rendering application.

16. A non-transitory computer-readable storage medium according to claim 11, wherein the apparatus is caused to further perform: displaying at least three possible metadata entries in a cycle according to a probability order in response to the selected key being associated with the possible metadata entries.

17. A non-transitory computer-readable storage medium according to claim 11, wherein the apparatus is caused to further perform: displaying a list of all metadata entries and corresponding media content item s in response to selection of a dedicated key.

18. A non-transitory computer-readable storage medium according to claim 12, wherein rendering of the activity comprises rendering one of:
   an image;
   a video file;
   an audio file;
   a television broadcast;
   a radio broadcast; text; or
   a web page.

19. A non-transitory computer-readable storage medium according to claim 11, wherein the metadata entry is modified using tag information obtained via browsing.

20. A non-transitory computer-readable storage medium according to claim 11, wherein rendering of the activity comprises recording of data.

21. An apparatus comprising at least one processor and at least one memory including computer program code, the at least one memory and the computer program code configured to, with the at least one processor, cause the apparatus to perform at least the following, cause, at least in part, rendering of an activity as a rendered media file involving a media content item;

cause, at least in part, reception of a selection of a pre-set, dedicated key of the apparatus to initiate assignment of an attribute to the media content item as metadata in the rendered media file, the pre-set, dedicated key being pre-set to automatically assign the attribute to a media content item as metadata when selected; and determine to modify a metadata entry of the rendered media file of the media content item associated with the rendered activity to include the attribute therein, in response to the selection of the pre-set, dedicated key, wherein the apparatus comprises at least one of a key of a touch screen and a key of a keypad corresponding to the pre-set, dedicated key, and wherein the pre-set, dedicated key having different functionality in each of a plurality of services within which the pre-set, dedicated key is used to initiate assignment of the attribute to the media content item as metadata, wherein the apparatus is further caused to:

cause, at least in part, display of a corresponding metadata entry while rendering a media content item, and determine to enter a new metadata entry of the media content item during creation of the media content item or during the rendered activity, in response to selection of the key, wherein the new metadata entry of the media content item references to at least one of a media application, a media content type, and media content context, and the media content context includes at least one of a location, time, and temperature.

22. An apparatus according to claim 21, wherein the attribute includes presence information of another device or a person, a name of the another device or the person in proximity of the electronic device, or a combination thereof.

23. An apparatus according to claim 21, wherein the apparatus modifies the metadata entry by rendering the media content item or the metadata of the rendered activity relating to the selected key, and the metadata entry of the media content item is modified during the rendered activity, in response to selection of the key.

24. An apparatus according to claim 21, wherein the attribute includes an event, title, playlist or genre information, presence information of another device or a person, a name of the another device or the person in proximity of the apparatus, or a combination thereof.

25. An apparatus according to claim 24, wherein the apparatus is caused to further perform: associating additional related data to the metadata entry, the additional related data comprises at least one of: an event; a date; a time; a title; playlist or genre information; context information; media type; and rendering application.

26. An apparatus according to claim 21, wherein the activity comprises one of:
an image;
a video file;
an audio file;
a television broadcast;
a radio broadcast;
text; or
a web page.

27. An apparatus according to claim 21, wherein the apparatus modifies the metadata entry by displaying at least three possible metadata entries in a cycle according to a probability order in response to the selected key being associated with the possible metadata entries.

28. An apparatus according to claim 21, wherein the apparatus modifies the metadata entry by associating ten most common metadata entries with corresponding ones of keypad numbers 0 through 9.

29. An apparatus according to claim 21, further comprising a dedicated key configured to execute a function associated with the metadata entry in response to selection of the dedicated key.

30. An apparatus according to claim 29, wherein the function comprises displaying a list of all metadata entries and corresponding media content items.

31. An apparatus according to claim 21, wherein the apparatus is within a mobile terminal.

\* \* \* \* \*